UNITED STATES PATENT OFFICE.

SAMUEL PEACOCK, OF CHICAGO, ILLINOIS, ASSIGNOR, BY MESNE ASSIGNMENTS, TO AGRICULTURAL RESEARCH CORPORATION, OF NEW YORK, N. Y., A CORPORATION OF NEW YORK.

PROCESS FOR PRODUCING CARBIDS OF SILICON AND BY-PRODUCTS.

1,134,081.  Specification of Letters Patent.  Patented Mar. 30, 1915.

No Drawing.  Application filed July 17, 1912. Serial No. 710,099.

*To all whom it may concern:*

Be it known that I, SAMUEL PEACOCK, a citizen of the United States, residing at Chicago, in the county of Cook and State of Illinois, have invented certain new and useful Improvements in Processes for Producing Carbids of Silicon and By-Products; and I do hereby declare the following to be a full, clear, and exact description of the invention, such as will enable others skilled in the art to which it appertains to make and use the same.

This invention relates to a process for producing carbids of silicon, aluminum and potassium from a mixture of feldspar and carbon, and has for its object the manufacture of carborundum, as well as other products in an efficient and expeditious manner.

To these ends the invention consists in the novel procedure constituting my invention all as will be more fully hereinafter disdisclosed and particularly pointed out in the claims.

In carrying out my invention, I provide a finely divided mixture of carbon, preferably in the form of coke, and feldspar, or leucite, or other suitable material, and so proportion the constituents that for each pound of silica present, there will be substantially eight tenths (.8) of a pound of carbon, while for each pound of alumina present, there will be substantially (.75) seventy-five hundredths of a pound of carbon, and for each pound of potash present, there will be substantially (.3) three tenths of a pound of carbon. This mixture is charged into a suitable air-tight electric furnace provided with an air pump adapted to maintain the pressure in said furnace at about (¾) three fourths of an atmosphere or lower. The temperature is next raised to about 2000° C. whereupon the carbids of aluminum and potassium that have been formed will be in a state of volatilization, and will be drawn off by said pump. The temperature is next further raised to substantially 2400° C. if it is desired to form siloxicon $Si_2C_2O$, and higher to say substantially 3300° or 3500° C. or higher in order to form carborundum SiC.

The carbids of aluminum and potassium may be collected in a suitable bag separator; or if desired they may be burned to alumina and to potassium carbonate by passing them through a combustion chamber with an excess of air.

From the foregoing it will be observed that by substituting feldspar for sand as the raw material in making carborundum or siloxicon, I am enabled to utilize the high temperatures required to recover aluminum and potash compounds as by-products, the value of which greatly exceed the additional cost involved.

By pumping out the furnace and thereby diminishing the partial pressures of the products of the reaction, I am enabled to produce the above carbids at lower temperatures than would otherwise be possible, and further the carbids of aluminum and potassium are not so liable to dissociate in the furnace after they have been formed. This also is true of siloxicon, which in the presence of air will dissociate at about 2700° C.

When it is desired to form siloxicon, apart from the three carbids above, the constituents of the charge are proportioned accordingly.

What I claim is:—

1. The process of making a compound containing silicon and carbon and recovering aluminum and potassium compounds which consists in heating a mixture of carbon and a finely divided mineral containing silicon, aluminum and potassium, to a temperature sufficient to produce aluminum and potassium carbids; pumping off said carbids from the sphere of the reaction; and then further heating the residue until said silicon compound is formed, substantially as described.

2. The process of making a compound containing silicon and carbon and recovering aluminum and potassium compounds which consists in heating under a pressure less than that of the atmosphere a mixture of carbon and a finely divided mineral containing silicon, aluminum and potassium, to a temperature sufficient to produce aluminum and potassium carbids; removing said carbids from the sphere of the reaction thereby lowering the partial pressures of the reaction products; and then further heating the residue until said silicon compound is formed, substantially as described.

3. The process of making carborundum and by-products from feldspar which consists in heating, under a pressure less than that of the atmosphere, a charge of finely divided feldspar and carbon to a temperature sufficient to form carbids of aluminum and potassium; removing said carbids from the charge and thereby lowering the partial pressures of the reaction products; then raising the temperature to a point sufficient to form the carborundum, substantially as described.

4. The process of making carborundum and by-products from feldspar which consists in heating, under a pressure less than that of the atmosphere, a charge of finely divided feldspar and carbon to a temperature sufficient to form carbids of aluminum and potassium; removing said carbids from the charge; then raising the temperature to a point sufficient to form siloxicon; and finally raising the temperature to a point sufficient to form the carborundum, substantially as described.

5. The process of making carborundum and by-products from feldspar which consists in heating, under a pressure less than that of the atmosphere, a charge of finely divided feldspar and carbon to a temperature sufficient to form carbids of aluminum and potassium; removing said carbids from the charge and burning them in an excess of air to form oxygen compounds of said metals; then raising the temperature to a point sufficient to form the carborundum, substantially as described.

In testimony whereof, I affix my signature, in presence of two witnesses.

SAMUEL PEACOCK.

Witnesses:
T. A. WITHERSPOON,
N. CURTIS LAMMOND.